3,486,356
FORMING APPARATUS AND METHOD
David F. Brower and Paul Wildi, San Diego, Calif., assignors to Gulf General Atomic Incorporated, San Diego, Calif., a corporation of Delaware
Continuation of application Ser. No. 414,711, Nov. 30, 1964. This application May 19, 1967, Ser. No. 639,911
Int. Cl. B21d 26/14
U.S. Cl. 72—56
3 Claims

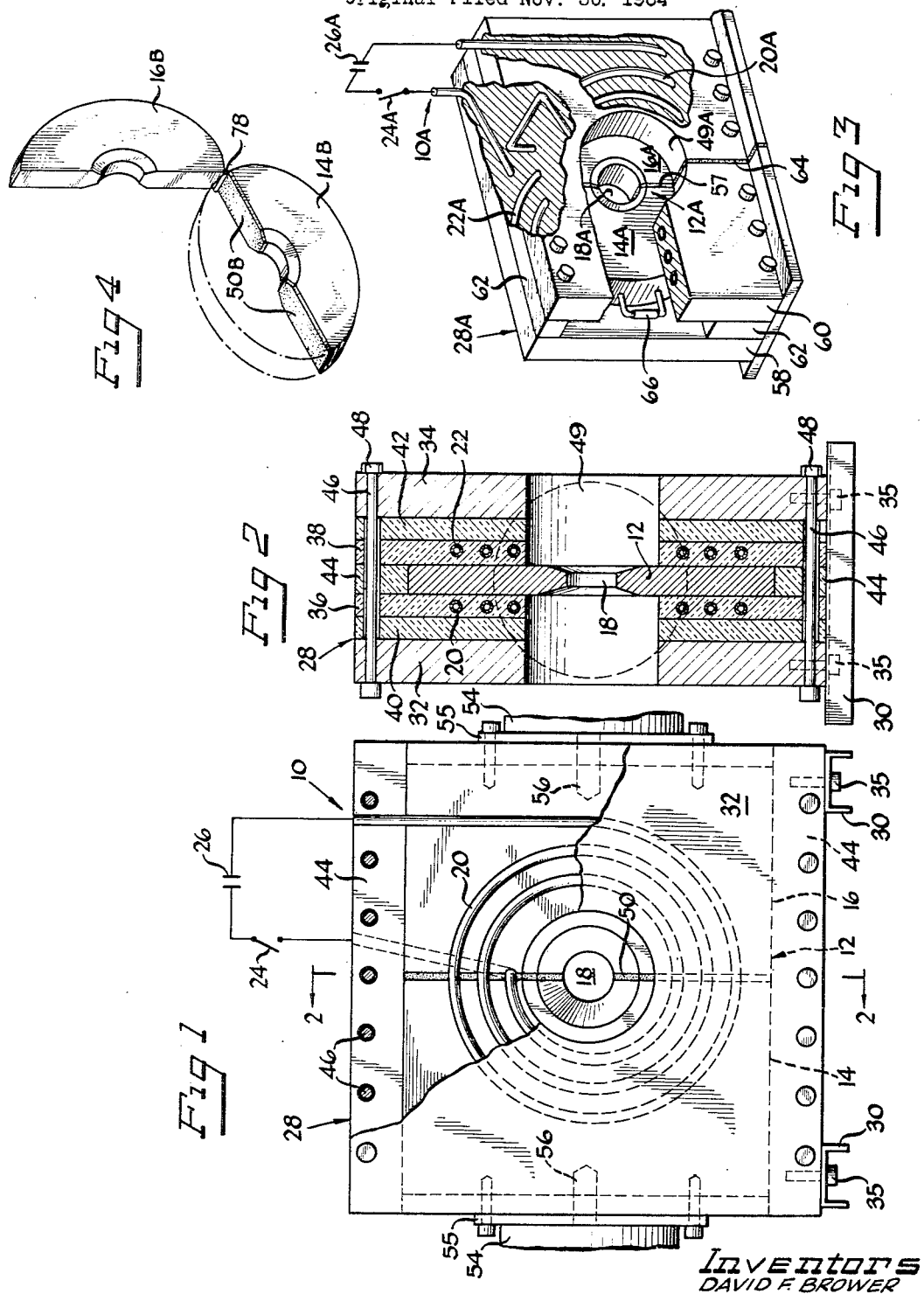
Dec. 30, 1969  D. F. BROWER ETAL  3,486,356
FORMING APPARATUS AND METHOD
Original Filed Nov. 30, 1964
Inventors
DAVID F. BROWER
PAUL WILDI
By Anderson, Luedeka, Fitch, Even & Tabin
Atty's United States Patent Office 3,486,356
Patented Dec. 30, 1969

ABSTRACT OF THE DISCLOSURE

A method and apparatus is provided for forming a conductive workpiece which includes a pair of mating segments. The segments are combinable to define a conductive body with an opening for a workpiece. The segments are separable from each other to expand the opening and facilitate insertion of the workpiece in the opening. The conductive body is movable to an operative position adjacent to the center of a conductive coil capable of producing a high intensity magnetic field. The coil is coupled to a source of current pulses so that a pulsed magnetic field is produced and intensified in the opening when the conductive body is in its operative position.

---

This application is a continuation of Ser. No. 414,711 filed Nov. 30, 1964, now abandoned.

The present invention relates generally to forming apparatus and methods and, more specifically, to devices and methods by means of which conductive material may be formed by energy acquired from a varying magnetic field.

In recent years methods and apparatus have been developed for forming materials by employing varying magnetic fields of high intensity. In such methods, an electrical current pulse of high amperage is passed through a conductor, thereby producing a pulsed magnetic field of high intensity. A conductive workpiece positioned in the pulsed magnetic field has a current pulse induced in it, which current pulse interacts with the magnetic field to produce a force acting on the workpiece. If the force is sufficiently strong, there results a deformation of the workpiece by the force. The manner of deformation is dependent upon the shape of the magnetic field and the position of the workpiece relative to the field. Repeated pulses of current may be applied to the conductor, thus causing a series of deforming impulses to be applied to the workpiece.

Ordinarily in such magnetic forming equipment, reduction of the cross section of a workpiece such as an elongated tube is accomplished by disposing an insulated coil connected to a source of current pulses concentrically about the workpiece. The current pulses through the coil induce current pulses concentrated on the surface of the workpiece, which induced current pulses interact with the magnetic field to produce a force on the workpiece directed inwardly along the radii of the coil.

In some applications it is desired to obtain greater force to form the elongated workpiece than is provided by the above-described equipment. In other applications, it is desired to concentrate the deforming force at points spaced longitudinally along or circumferentially around the elongated workpiece. These results are achieved by employing a magnetic field shaper which, when used in conjunction with an elongated workpiece, is generally in the form of a cylindrical conductive body fixed in the center of the coil in coaxial relationship therewith. The field shaper has a central axially extending aperture into which the workpiece is inserted, the workpiece being insulated from the inner surface of the field shaper. The pulsed magnetic field produced by the coil induces a pulsed current in the field shaper which is concentrated on its inner surface. This current pulse flowing on the inner surface of the field shaper creates a magnetic field in the central aperture which is more intense than that produced by the coil because of the increased flux density within the aperture due to its smaller area.

The flux density and, therefore, the force on the workpiece within the aperture are dependent upon the shape of the inner surface of the field shaper and upon the location of the inner surface relative to the workpiece. The flux density may be increased in certain areas by providing inwardly extending projections on the inner surface of the field shaper in the vicinity of such areas. For example, a tube can be constricted intermediate its ends through the use of a field shaper which includes a flange projecting inwardly from its inner surface to define a narrow throat.

In certain applications the elongated workpiece is not cylindrical or of uniform cross section but has portions on both sides of the portion to be formed which have larger cross sections than the portion to be formed. This is true, for example, where the workpiece has flanged or flared ends. In such situations it is difficult or impossible for the portion to be formed to be properly disposed within a conventional field shaper by longitudinal movement of the workpiece axially of the field shaper.

An important object of the present invention, therefore, is to provide a method of and apparatus for the forming of an elongated workpiece having a varying cross section. Another object is to provide a magnetic forming apparatus which may be adapted to form diverse sizes and shapes of workpieces. Still another object is to provide a field shaper for a magnetic forming apparatus which may be quickly and easily positioned adjacent to and removed from a workpiece. A further object is to provide a magnetic forming apparatus which is efficient in operation, relatively inexpensive to manufacture and durable in use.

Other objects and advantages of the present invention will become apparent by reference to the following description and accompanying drawings, in which:

FIGURE 1 is a partially schematic and partially broken away elevational view of a magnetic forming apparatus showing various of the features of the present invention;

FIGURE 2 is a sectional view taken along line 2—2 of FIGURE 1;

FIGURE 3 is a partially schematic and partially broken away perspective view of another embodiment of the present invention; and FIGURE 4 is a detailed perspective view of another form of construction of a field shaper showing various of the features of the present invention.

As shown in the embodiment illustrated in FIGURES 1 and 2, the present invention generally includes means 10 for producing a high-intensity pulsed magnetic field, and field shaping means adapted to be disposed in the magnetic field including a conductive member or field shaper 12 formed of separable segments 14 and 16 which, when joined, cooperate to define a central aperture defining a workspace 18. When the segments 14 and 16 are separated, they permit insertion or removal of a workpiece (not shown) into the workspace even though the workpiece may include cross sectional areas having dimensions which exceed the diameter of the workspace 18 defined by the joined segments.

More specifically, in the illustrated embodiment the field producing means 10 includes two insulated coils 20 and 22 in the form of flat spirals which are electrically connected through a switch means 24 to a source 26 of current pulses, such as a charged capacitor bank. The coils 20 and 22 are disposed in spaced apart coaxial relation to each other and are mounted in a supporting structure 28. It should be understood, of course, that a single coil rather than a pair of coils might be used, and that the coil or coils employed might have other than a flat spiral configuration. However, the use of a pair of spaced apart coils of flat spiral configuration has been found to be preferable.

The supporting structure 28, as shown in FIGURES 1 and 2, includes a base 30 on which are mounted two vertical parallel end plates 32 and 34, preferably formed of steel to provide mass and strength to withstand the impulse created by the pulsed magnetic field. The end plates which are attached to the base by bolts 35 may alternatively be formed of a suitable strong insulator which is transparent to magnetic flux. The coils 20 and 22 are each embedded in flat coil bodies 36 and 38 formed of a suitable insulator which is transparent to magnetic flux. The coil bodies 36 and 38 are mounted between the two end plates in spaced apart parallel relationship to each other and to the end plates. Spacers 40 and 42 formed of an insulating material which is transparent to magnetic flux occupy the space between each coil body and the adjacent end plate.

The space between the two coil bodies is occupied in part by spacers 44 formed of an insulating material and extending horizontally and parallel to the end plates at the top and bottom of the supporting structure 28. Thus, the coil bodies and spacers cooperate to define a cavity within which the field shaper 12 is disposed. The coil bodies 36 and 38, spacers 44, end plates 32 and 34 and spacers 40 and 42 are securely attached to each other by bolts 46 which extend horizontally between the outer faces of the end plates and are secured by nuts 48. The end plates 32 and 34, spacers 40 and 42 and coil bodies 36 and 38 are each provided with central openings which form a generally cylindrical hole 49 extending between the outer faces of the end plates for insertion of a workpiece.

The generally rectangular field shaper 12 is disposed between the coil bodies 36 and 38 and includes mating conductive segments 14 and 16 which are relatively movable into spaced apart relation with one another transversely to the axis of the coils without removing the segments from the supporting structure 28. An axially extending aperture in the field shaper 12 provides the workspace 18 for the workpiece and is suitably shaped for forming the workpiece into the desired configuration. More specifically, the aperture is defined by side walls which converge inwardly from the opposite sides of the field shaper and which terminate centrally in an inwardly projecting flange.

Electrical insulation 50 is provided intermediate the mating surfaces of the segments 14 and 16 and is coextensive therewith. Thus, the surfaces adjacent the insulation and the inner and outer surfaces of the field shaper 12 form continuous conductive paths and permit a magnetic field to be established within the workspace 18.

It will be apparent that when the segments 14 and 16 of the field shaper 12 are arranged in closed configuration as shown in FIGURE 1, i.e., when the field shaper segments 14 and 16 are mated to one another, an elongated workpiece having a portion at each of its ends which is of a larger cross sectional area than the smallest cross section of the workspace cannot be inserted in the workspace by moving it longitudinally thereof. Thus, if the field shaper were in the form of a single annular member, workpieces of such shape could not be accommodated. In the illustrated construction, however, in which the field shaper 12 is formed of the separable segments 14 and 16, the segments 14 and 16 may be moved into spaced apart relation for positioning the workpiece in the workspace.

In the embodiment shown in FIGURES 1 and 2 the segments 14 and 16 are each movable by means of pneumatically operated actuating cylinders 54 mounted on the sides of the supporting structure 28 by plates 55 attached to the end plates 32 and 34. The cylinders 54 each include a piston 56 attached to the segments 14 and 16. One of the segments could, however, be fixed in the supporting structure or other means could be utilized to move the segment.

In the operation of the embodiment shown in FIGURES 1 and 2, the segments 14 and 16 are moved into spaced apart relation by the actuating cylinder 54, thus expanding the workspace 18. Insulation is provided between the elongated workpiece and the inner surface of the field shaper as by wrapping the workpiece in a suitable material. The workpiece is then moved longitudinally into the hole 49 in a supporting structure 28 and secured in the workspace 18 by moving the segments 14 and 16 into a closed position about the workpiece. The switch means 24 is then closed, thereby causing the capacitor bank 26 to discharge through the coils 20 and 22. The current pulse through the coil causes a pulsed magnetic field to be produced within the coils which induces a surface current pulse in the field shaper 12. This induced current flows around the surfaces of each segment of the field shaper 12, along the adjacent faces thereof, around the inner surfaces of the segments and along adjacent surfaces and back to the outer surface of the field shaper. Thus, two parallel current paths are provided which cause a high intensity pulsed magnetic field to be produced in the workspace 18, which field exerts force on the workpiece, thereby forming it in the desired manner. The field shaper segments in the illustrated embodiment will remain essentially in place during firing of the coils due to their inertia. However, a locking mechanism or dash pot arrangement to prevent or minimize movement of the segments may be attached to the supporting structure if desired.

Another embodiment of the present invention is shown in FIGURE 3 wherein a field producing means 10A is provided including a pair of insulated spiral flat coils 20A and 22A connected through a switch means 24A to a source of current pulses 26A. The coils 20A and 22A are disposed in spaced apart coaxial relation to each other and are embedded in a supporting structure 28A similar to that shown in FIGURES 1 and 2 in that it includes a central hole 49A extending between opposite faces. A field shaping means is provided which is generally similar to that shown in FIGURES 1 and 2 in that it includes a conductive member or field shaper 12A formed of separable segments 14A and 16A which, when joined define a workspace 18A which is coaxial with the coils and an insulated slot 57 which extends between the workspace and the outer surface of the field shaper.

In the embodiment shown in FIGURE 3, however, the supporting structure 28A comprises two parallel metallic blocks 58 and 60 in which the coils 20A and 22A are embedded. The blocks are separated by metallic spacers 62 extending horizontally and parallel to the blocks 58 and 60 at the top and bottom of the supporting structure. The field shaper 12A is disposed in the space defined by the two blocks 58 and 60 and the spacers 62. Since the supporting structure 28A is conductive in the embodiment of FIGURE 3 an insulated slot 64 is provided extending between the hole 49A and the outer surface of the supporting structure 28A. In operation the slot 64 is aligned with the slot 57 so that the walls of the two slots, the outer surface of the supporting structure and the inner surface of the field shaper form a continuous conductive surface and permit a magnetic field to be established within the workspace 18A. Suitable insulation is provided between the field shaper 12A and the parallel metallic blocks 58 and 60.

As shown in FIGURE 3 the segment 16A is fixed in the supporting structure and the segment 14A is movable relative to it, this movement being lateral in the illustrated embodiment. Movement of the segment 14A is accomplished manually by means of a handle 66 which is connected to the segment 14A.

Movement of the handle 66 causes lateral movement of the segment 14A relative to the segment 16A, thus expanding the workspace 18A and permitting insertion of a workpiece. Insulation is disposed about inner faces of the segments 14A and 16A, or about the elongated workpiece which is moved longitudinally along the axis of the coils until the portion to be formed is positioned adjacent the segments 14A and 16A. The segments are positioned about the workpiece by moving the handle 66 inwardly. The switch means 24A is then closed, causing a high intensity pulsed magnetic field in the workspace thereby forming the workpiece.

The segments of the field shaper may be arranged for pivotal movement as well as for movement transverse to the axis of the coils. As is shown in FIGURE 4, two segments 14B and 16B may be hingedly connected along the outer edge of one of their pairs of mating surfaces by single pivot means 78. As in the other illustrated embodiments electrical insulation 50B is provided intermediate the mating surfaces.

Various other changes and modifications may be made in the above described method and apparatus for forming without deviating from the spirit and scope of the present invention, various features of which are set forth in the accompanying claims.

What is claimed is:

1. Apparatus for forming a conductive workpiece comprising a pair of mating segments combinable to define a conductive body including an opening for receiving a conductive workpiece, adjacent surfaces of said segments being insulated from each other so as to interrupt the continuity of the inner and outer surfaces of said conductive body when said segments are in their mating position, two spiral flat conductive coils capable of producing a high intensity magnetic field, said coils being positioned in spaced apart coaxial and parallel relationship to each other, means for coupling said coils to a source of a current pulse so that said coils produce a pulsed magnetic field, and a body supporting said coils and including a central opening between said coils for receiving said conductive body so that the magnetic field produced by the coils is concentrated within the opening defined by said conductive body, said segments being separable from each other by movement of at least one of said segments in its entirety relative to the other in a direction transverse to the longitudinal axis of said coils thereby expanding said opening and facilitating the insertion of a workpiece thereinto.

2. Apparatus for forming an electrically conductive workpiece, comprising a flux concentrator formed of relatively movable, mating electrically conductive segments combinable to define and encompass a workspace for the workpiece, the continuity of the conductive path through said conductive segments about the workspace being interrupted when said segments are in their mated position, an electrically conductive coil having an axis and acting when energized to produce a magnetic field, said segments being separable from each other by movement of at least one of said segments relative to another in a direction transverse to the axis of said coil, thereby opening said workspace and facilitating insertion of the workpiece thereinto, said segments being movable between an open position where said segments are spaced from one another transversely of said axis and an operating position where said segments are in their mated position in operative association with said coil with said workspace disposed generally centrally of said coil with the workpiece extending through said coil, and means for electrically energizing said coil when said segments are in said operating position so as to develop a high intensity magnetic field which is intensified within said workspace by said flux concentrator.

3. A method of forming an electrically conductive workpiece comprising disposing the workpiece in a workspace defined and encompassed by a flux concentrator and located generally centrally of a conductive coil having an axis, with the workpiece extending through said coil, and electrically energizing the coil to develop a high intensity magnetic field within the workpiece and thereby form the workpiece, the flux concentrator being formed of relatively movable mating electrically conductive segments, the disposing of the workpiece in the workspace including placing the workpiece between said segments when the segments are spaced from one another transversely of said axis, and moving at least one of said segments relative to another in a direction transverse of said axis to bring said segments into their mated relationship surrounding the workpiece, the continuity of the conductive path through said conductive segments about the workspace being interrupted when said segments are in their mated relationship.

References Cited

UNITED STATES PATENTS

| 3,108,325 | 10/1963 | Harvey et al. | 72—56 |
| 3,214,832 | 11/1965 | Schwinghamer | 72—56 |
| 3,252,313 | 5/1966 | Eilers et al. | 72—56 |
| 3,253,443 | 5/1966 | Malmberg | 72—56 |

RICHARD J. HERBST, Primary Examiner